May 5, 1942.  R. L. KERR  2,281,697
LUBRICATED PLUG VALVE
Filed Sept. 25, 1940  2 Sheets-Sheet 1
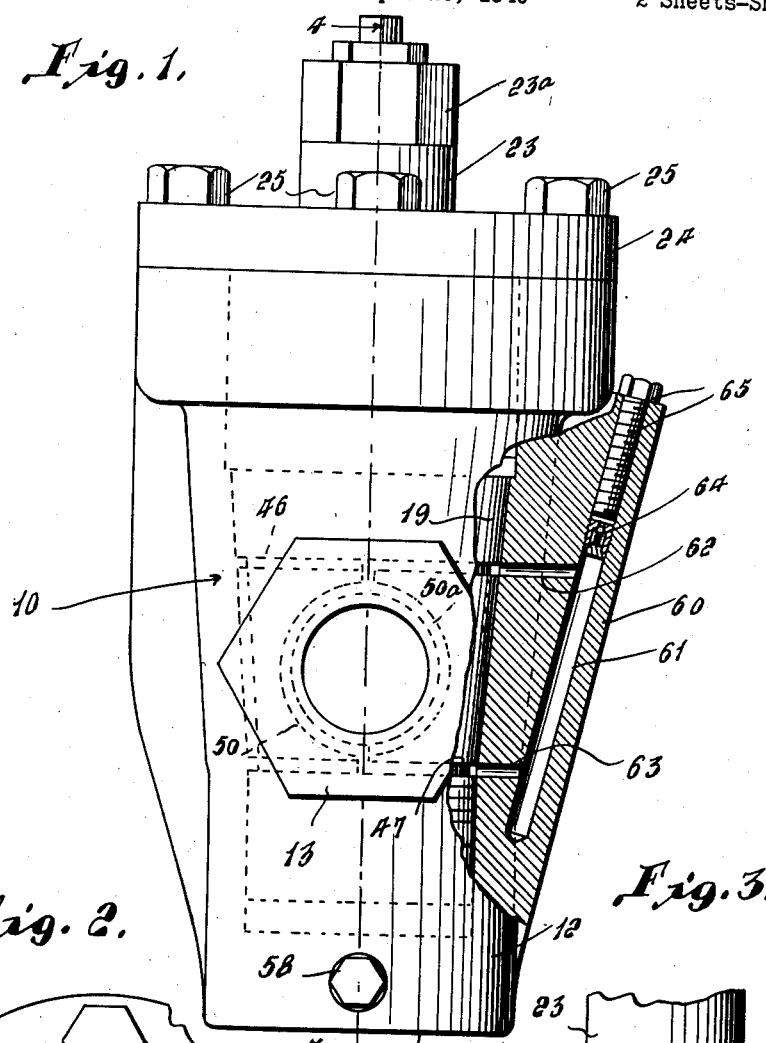
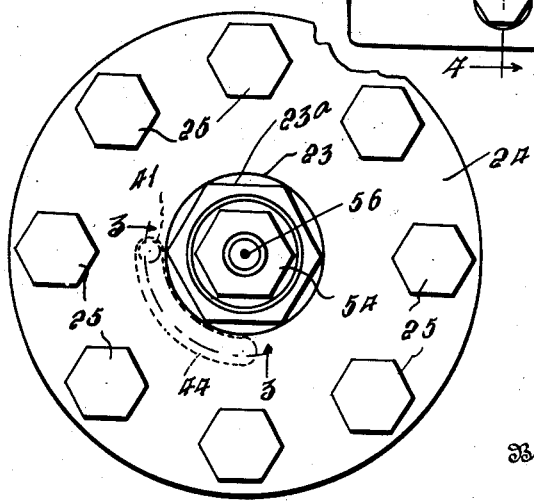
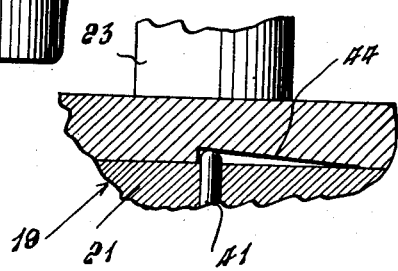
Inventor
Ralph L. Kerr
By F. K. Bryant
Attorney May 5, 1942.  R. L. KERR  2,281,697
LUBRICATED PLUG VALVE
Filed Sept. 25, 1940  2 Sheets-Sheet 2

Inventor
Ralph L. Kerr
By  F. K. Bryant
Attorney.

Patented May 5, 1942

2,281,697

UNITED STATES PATENT OFFICE 2,281,697

LUBRICATED PLUG VALVE

Ralph L. Kerr, Houston, Tex.

Application September 25, 1940, Serial No. 358,343

14 Claims. (Cl. 251—93)

This invention relates to certain new and useful improvements in lubricated plug valves.

The primary object of the invention is to provide a plug valve embodying a valve body or casing with a plug rotatable therein combined with a reservoir for lubricants within the plug adapted to be forcibly ejected into position for lubricating the contacting faces of the plug and valve body.

A further object of the invention is to provide a lubricated plug valve of the foregoing character wherein a valve body has a valve plug rotatable therein with separate lubricant chambers respectively carried by the valve plug and valve body and further respectively automatically and manually operated for forcing a charge of lubricant between the contacting faces of the valve body and plug.

It is a further object of the invention to provide a lubricated plug valve of the type set forth wherein packing means is associated with the upper and lower ends of a rotary valve plug in a valve casing to provide a seal against the escape of lubricant that is delivered to the intermediate portion of the valve plug and casing.

With the above and other objects in view that will become apparent as the nature of the invention is better understood, the same consists in the novel form, combination and arrangement of parts hereinafter more fully described, shown in the accompanying drawings and claimed.

Figure 1 is a side elevational view, partly broken away and shown in section of a lubricated plug valve constructed in accordance with the present invention and illustrating the manually operable means for forcing a charge of lubricant onto the contacting faces of a valve casing and rotary valve plug;

Figure 2 is a fragmentary top plan view;

Figure 3 is a detail sectional view taken on line 3—3 of Figure 2, showing the automatically operating cam actuated plunger for feeding a charge of lubricant to the contacting faces of the valve casing or body and plug;

Figure 4:
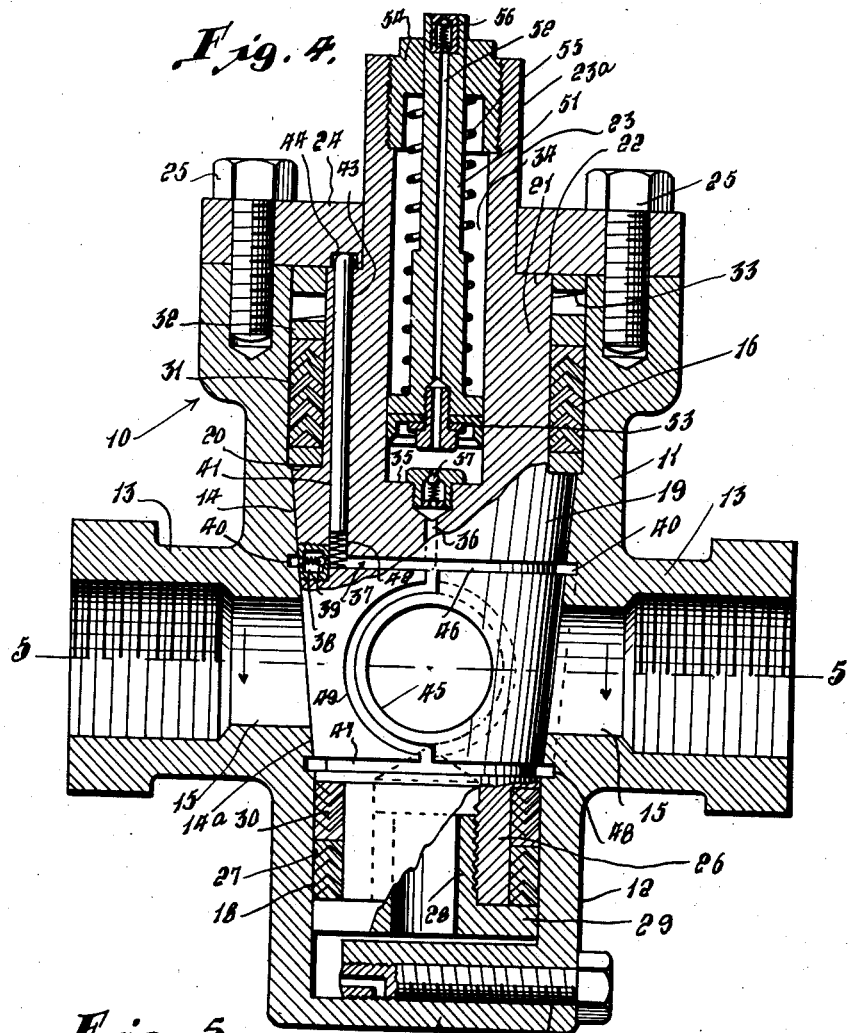
Figure 4 is a vertical cross-sectional view taken on line 4—4 of Figure 1, showing the automatically operating devices for feeding a charge of lubricant to the contacting faces of the valve body and plug.

Referring more in detail to the accompanying drawings, there is illustrated a lubricated plug valve wherein the valve body designated in general by the reference character 10, is of general cruciform design as shown in Figure 4, with a vertical leg portion comprising a head 11 and a base 12 with diametrically opposite side fittings 13. The valve body 10 is of hollow formation and has a tapered valve seat 14 extending from the lower portion of the head 11 downwardly through the side fittings 13 to terminate at the point 14a above the base portion 12 of the valve body. The side fittings 13 have openings 15 therein that communicate with the interior of the valve body. The interior of the head 11, as shown in Figure 4, above the tapered valve seat 14, has a cylindrical wall surface 16 opening at the upper end of the head 11. The lower end 17 of the base 12 of the valve body is closed and said base portion has a cylindrical inner wall 18.

The valve plug 19 is of tapering formation for seating engagement with the tapered valve seat 14 in the valve body 10, the upper end of the tapered valve plug 19 above the valve seat 14 being annularly reduced to provide a shoulder 20, the valve plug 19 having a cylindrical extension 21 rising from the shoulder 20 with the extension terminating in the plane of the upper end of the head 11 of the valve body and there provided with a shoulder 22 from which rises a second cylindrical extension 23. A cap plate 24 is provided for the head 11 of the valve body and has a central opening therein through which the valve plug extension 23 passes, said cap plate 24 being engaged with the shoulder 22 at the upper end of the cylindrical extension 21 for retaining the valve plug 19 within the valve body, the cap plate 24 being retained in position upon the upper end of the head 11 by means of headed screw bolts 25 as clearly illustrated.

As shown more clearly in Figure 4, an internally threaded tubular extension 26 depends at the lower end of the tapered valve plug 19 into the base 12 of the valve body 10 and is of less diameter than the internal diameter of said base 12 to provide an annular channel 27 and said internally threaded tubular extension 26 receives the externally threaded upstanding tubular nipple 28 rising from a disk plate 29 that moves into engagement with the lower end of the tubular extension 26. A leakproof grease packing is arranged in the channel 27 below the lower end 14a of the valve seat.

An annular chamber is formed between the cylindrical wall 16 of the valve head 11 and the outer wall of the cylindrical extension 21 for the reception of a leak-proof grease packing 31, follower rings 32 being disposed in the upper end of the channel above the packing 31 and having a spring ring 33 interposed therebetween to add pressure to the packing rings 31 and prevent the escape of lubricant.

A cylindrical chamber 34 is formed in the extensions 21 and 23 of the valve plug and the bottom wall 35 of the chamber 34 has a central port 36 extending axially downwardly therethrough as shown in Figure 4 and then is directed at right angles as shown at 37 toward the tapered valve seat 14, the outer end of the port 37 being in communication with a relatively small lubricant receptacle 38 formed in the valve plug 19, the lubricant receptacle 38 being provided with a tensioned check valve 39 closing toward the port 37 with the outer side of the lubricant receptacle 38 being in communication with an annular groove 40 formed in the inner face of the tapered valve seat 14 that faces the valve plug 19. A plunger rod 41 is slidably mounted longitudinally of the cylindrical extension 21 laterally of the lubricant chamber 34, the lower end of the plunger rod 41 being engaged by the spring 42 set into the lower end of the longitudinally extending bore 43 in which the plunger rod 41 is mounted, the lower end of said bore 43 being in communication with the outer end of the lubricant port 37. The upper end of the plunger rod 41 extends through the shoulder 22 at the upper end of the cylindrical extension 21 and as shown in Figures 2 and 4 is maintained in engagement with the cam surface 44 formed on the bottom face of the cap plate 24 of the valve body, the cam surface 44 extending in an arc as illustrated.

Figure 5:
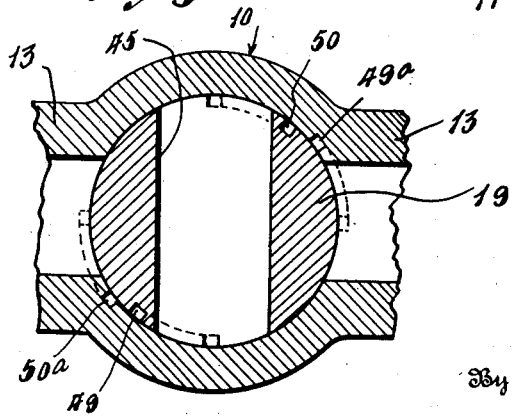
Figure 5 is a horizontal sectional view taken on line 5—5 of Figure 4.

The valve plug 19 has a cross bore 45 therein that is adapted to register with the tubular side fittings 13 when the valve plug is in its open position and said valve plug has a peripheral annular groove 46 therein registering with the annular groove 40 in the upper end 14 of the tapered valve seat, while said valve plug 19 has a second peripheral annular groove 47 below the cross bore 45 that registers with an annular groove 48 in the lower end 14a of the tapered valve seat. One side of the valve plug 19 as shown more clearly in Figures 4 and 5 has an arcuate groove 49 of semi-circular formation disposed adjacent to and at one side of the cross bore 45 while the other side of the valve plug 19 has a similar lubricant groove 50 therein at the other side of the cross bore 45, the lubricant grooves 49 and 50 being so disposed as to remain out of registry with the side fittings 13 when the valve plug is in either of its open or closed positions. It will be observed from an inspection of Figure 4 that the upper and lower ends of the semi-circular lubricant grooves 49 respectively communicate with the annular grooves 46 and 47. It will also be observed from an inspection of Figure 5 that semi-circular grooves 49a and 50a similar to the grooves 49 and 50 are formed in the tapered valve seat 14 so that when the valve plug is rotated in the direction indicated by the arrow in Figure 5, the semi-circular groove 49 at one side of the cross bore 45 in the valve plug 19 will co-act with the groove 49a in the valve seat 14 to form a complete circular groove surrounding the side fitting 13 and communicating at the upper and lower ends thereof with the annular lubricant grooves 46 and 47 and in a like manner, the grooves 50 and 50a correspondingly register.

A plunger rod 51 having an axial bore 52 therethrough is slidably mounted in the lubricant chamber 34, the plunger 51 carrying a piston head 53 at its lower end provided with the usual leather gasket wiping over the walls of the lubricant chamber 34, the upper end of the plunger 51 slidably extending through a cap nut 54 internally threaded into the outer end of the second extension 23 on the upper end of the valve plug. A coil spring 55 surrounds the plunger 51, being engaged at its upper end with the cap nut 54 and at its lower end with the piston head 53 for normally forcing the plunger 51 downwardly in the lubricant chamber. An upwardly closing tensioned check valve 56 is associated with the upper end of the axial bore 52 in the plunger 51 with the plunger being of the general construction of an "Alemite" lubricating device. An upwardly closing check valve 57 is associated with the axial port 36 formed in the bottom wall 35 of the lubricant chamber 34 to prevent the return of lubricant into the chamber 34 that is forced therefrom by the tensioned plunger 51.

From an inspection of Figure 1, it will be observed that the upper end of the cylindrical extension 23 on the valve plug is provided with a T-portion 23a for the attachment of a wrench to facilitate rotation of the valve plug 19. Assuming the angle ports 36 and 37 to be filled with lubricant, rotation of the valve plug 19 in the direction of the arrows shown in Figure 5, causes the cam surface 44 upon the bottom face of the cap plate 24 to ride over and depress the plunger rod 41 against the tension of the spring 42 to force lubricant from the angle ports 36 and 37 by way of the check valve 39 into the lubricant chamber 38 for discharge into the passage 46 and from said passage through the semi-circular passages 49 and 50 to the lower annular passage 47 and from all of these passages into corresponding passages or grooves formed in the adjacent faces of the valve seat. Upon reverse movement of the valve plug 19, the plunger rod 41 is permitted to rise under influence of its spring 42 while the spring 55 associated with the plunger rod 51 forces an additional supply of lubricant from the chamber 34 by way of a check valve 57 into the angle ports 36 and 37. Lubricant may be charged into the lubricant chamber 34 by the use of an ordinary grease gun, or the plunger 51 may be removed from the chamber 34 by releasing the cap nut 54 and replacing said plunger after manually charging the chamber 34 with lubricant.

Should the valve plug 19 become frozen to its seat, the screw plug 58 is removed from the base portion 12 of the valve body as shown in Figure 4 and lubricant manually placed in the lower end of the base portion 12 below the lower end of the valve body and upon return placement of the screw 58, the lubricant is forced upwardly against the lower end of the valve plug to unseat the same from its frozen position.

The valve body is also provided with manually operating means for supplying lubricant to the several cooperating grooves formed in the contacting faces of the valve seat and the valve plug and as shown in Figure 1, the valve body carries a laterally offset body portion 60 at one side thereof between the diametrically opposite side fittings 13, the body portion 60 being provided with a longitudinal recess or chamber 61 having laterally directed ports 62 and 63 respectively communicating with the annular grooves 46 and 47 of the valve plug 19. The upper end of the chamber 61 above the upper port 62 has an upwardly closing check valve 64 and lubricant placed in the upper end of the chamber 61 is forced downwardly by the screw plug follower 65 that is manually operated for forcing lubricant past the check valve 64 to fill the chamber 61 and force the lubricant through the lateral ports 62 and 63 into the annular grooves in the valve plug 19.

From the above detailed description of the invention, it is believed that the construction and operation thereof will at once be apparent and while there is herein shown and described the preferred embodiment of the invention, it is nevertheless to be understood that minor changes may be made therein without departing from the spirit and scope of the invention as claimed.

I claim:

1. In a lubricated valve of the character described, a valve body having inlet and outlet ports, a rotary valve plug in the body controlling flow through the inlet and outlet ports and engaged with an annular valve seat in the body, the contacting faces of the valve plug and valve seat being cooperatively constructed with lubricant receiving grooves and a plunger reciprocably mounted in the valve plug having one end engaging a cam face on the valve body for supplying lubricant to the contacting faces of the valve seat and valve plug, and manually operated lubricant supply means carried by the valve plug.

2. A lubricated valve as specified in claim 1, wherein lubricant pressure means is associated with the lower end of the valve body and valve plug for unseating the valve when frozen to its seat.

3. A lubricated valve as specified in claim 1, wherein the manually operated lubricant supply means includes a lubricant chamber in the valve plug with ports leading from the chamber to the valve seat and means for forcing lubricant from the chamber through the ports to said valve seat.

4. A lubricated valve as specified in claim 1, wherein lubricant pressure means is associated with the lower end of the valve body and valve plug for unseating the valve when frozen to its seat, the manually operated lubricant supply means including a lubricant chamber in the valve plug with ports leading from the chamber to the valve seat and means for forcing lubricant from the chamber through the ports to said valve seat.

5. In a lubricated valve of the character described, a valve body having inlet and outlet ports, a rotary valve plug in the body controlling flow through the inlet and outlet ports and engaged with an annular valve seat in the body, the contacting faces of the valve plug and valve seat being cooperatively constructed with lubricant receiving grooves and independent automatic and manually operated lubricant supply means in the valve plug and body for selective use in supplying lubricant to the contacting faces of the valve seat and valve plug, the automatically operating lubricant supply means includes a lubricant chamber in the valve plug, ports in the valve plug forming communication between the lubricant chamber and the valve seat, tensioned lubricant feeding means in said chamber for forcing lubricant through the ports, means to prevent return flow of lubricant to the chamber, and a spring retracted plunger rod carried by the plug with one end engaged with the valve body to be projected thereby during rotation of the valve plug for forcing lubricant from the ports to the valve seat.

6. In a lubricated valve of the character described, a valve body having inlet and outlet ports, a rotary valve plug in the body controlling flow through the inlet and outlet ports and engaged with an annular valve seat in the body, the contacting faces of the valve plug and valve seat being cooperatively constructed with lubricant receiving grooves and independent automatic and manually operated lubricant supply means in the valve plug and body for selective use in supplying lubricant to the contacting faces of the valve seat and valve plug, lubricant pressure means is associated with the lower end of the valve body and valve plug for unseating the valve when frozen to its seat, the automatically operating lubricant supply means including a lubricant chamber in the valve plug, ports in the valve plug forming communication between the lubricant chamber and the valve seat, tensioned lubricant feeding means in said chamber for forcing lubricant through the ports, means to prevent return flow of lubricant to the chamber, and a spring retracted plunger rod carried by the plug with one end engaged with the valve body to be projected thereby during rotation of the valve plug, for forcing lubricant from the ports to the valve seat.

7. In a lubricated valve of the character described, a valve body having inlet and outlet ports, a rotary valve plug in the body controlling flow through the inlet and outlet ports and engaged with an annular valve seat in the body, the contacting faces of the valve plug and valve seat being cooperatively constructed with lubricant receiving grooves and independent automatic and manually operated lubricant supply means in the valve plug and body for selective use in supplying lubricant to the contacting faces of the valve seat and valve plug, the manually operated lubricant supply means includes a lubricant chamber in the valve body with ports leading from the chamber to the valve seat and means for forcing lubricant from the chamber through the ports to said valve seat, the automatically operating lubricant supply means including a lubricant chamber in the valve plug, ports in the valve plug forming communication between the lubricant chamber and the valve seat, tensioned lubricant feeding means in said chamber for forcing lubricant through the ports, means to prevent return flow of lubricant to the chamber, and a spring retracted plunger rod carried by the plug with one end engaged with the valve body to be projected thereby during rotation of the valve plug for forcing lubricant from the ports to the valve seat.

8. A lubricated valve as specified in claim 1, wherein lubricant packing rings are placed between the upper and lower ends of the valve plug and valve body to retain the lubricant in the zone of the valve and seat.

9. In a lubricated valve of the character described, a valve body having inlet and outlet ports, a rotary valve plug in the body controlling flow through the inlet and outlet ports and engaged with an annular valve seat in the body, the contacting faces of the valve plug and valve seat being cooperatively constructed with lubricant receiving grooves and independent automatic and manually operated lubricant supply means in the valve plug and body for selective use in supplying lubricant to the contacting faces of the valve seat and valve plug, the automatically operating lubricant supply means includes a lubricant chamber in the valve plug, ports in the valve plug forming communication between the lubricant chamber and the valve seat, tensioned lubricant feeding means in said chamber for forcing lubricant through the ports, means to prevent return flow of lubricant to the chamber, and a spring retracted plunger rod carried by the plug with one end engaged with the valve body to be projected thereby during rotation of the valve plug for forcing lubricant from the ports to the valve seat, the engagement of the tensioned plunger with the valve body including an arcuate cam surface on the valve body over which the contacting end of the plunger rod rides.

10. In a lubricated valve of the character described, a valve body having inlet and outlet ports, a rotary valve plug in the body controlling flow through the inlet and outlet ports and engaged with an annular valve seat in the body, the contacting faces of the valve plug and valve seat being cooperatively constructed with lubricant receiving grooves and independent automatic and manually operated lubricant supply means in the valve plug and body for selective use in supplying lubricant to the contacting faces of the valve seat and valve plug, the manually operated lubricant supply means includes a lubricant chamber in the valve body with ports leading from the chamber to the valve seat and means for forcing lubricant from the chamber through the ports to said valve seat, the automatically operating lubricant supply means including a lubricant chamber in the valve plug, ports in the valve plug forming communication between the lubricant chamber and the valve seat, tensioned lubricant feeding means in said chamber for forcing lubricant through the ports, means to prevent return flow of lubricant to the chamber, and a spring retracted plunger rod carried by the plug with one end engaged with the valve body to be projected thereby during rotation of the valve plug for forcing lubricant from the ports to the valve seat, the engagement of the tensioned plunger with the valve body including an arcuate cam surface on the valve body over which the contacting end of the plunger rod rides.

11. A lubricated valve as specified in claim 1, wherein lubricant pressure means is associated with the lower end of the valve body and valve plug for unseating the valve when frozen to its seat, and a packing interposed between the valve body and valve plug above and below the valve seat to prevent passage of lubricant to said inlet and outlet ports.

12. A lubricated valve as specified in claim 1, wherein lubricant pressure means is associated with the lower end of the valve body and valve plug for unseating the valve when frozen to its seat and a packing interposed between the valve body and valve plug above and below the valve seat to prevent passage of lubricant to said inlet and outlet ports and the opposed faces of the valve body and valve plug engaged with said packing being cylindrical.

13. A lubricated valve as specified in claim 1, wherein a packing is interposed between the valve body and valve plug above and below the valve seat to prevent passage of lubricant away from the valve seat.

14. A lubricated valve as specified in claim 1, wherein a packing is interposed between the valve body and valve plug above and below the valve seat to prevent passage of lubricant away from the valve seat, means for resiliently holding the valve plug on its seat and the upper packing being in a plane below the valve seating means.

RALPH L. KERR.